US008545600B2

(12) United States Patent
Dingler et al.

(10) Patent No.: US 8,545,600 B2
(45) Date of Patent: Oct. 1, 2013

(54) METHOD FOR THE DEPOSITION OF PAINT OVERSPRAY, AND DEPOSITION LIQUID

(75) Inventors: Guenther Dingler, Ostelheim (DE);
Erwin Hihn, Walddorfhaeslach (DE);
Werner Swoboda, Boeblingen (DE);
Michael Schlipf, Goeppingen (DE)

(73) Assignee: Eisenmann AG (DE)

( * ) Notice: Subject to any disclaimer, the term of this patent is extended or adjusted under 35 U.S.C. 154(b) by 117 days.

(21) Appl. No.: 13/060,796

(22) PCT Filed: Aug. 13, 2009

(86) PCT No.: PCT/EP2009/005863
§ 371 (c)(1),
(2), (4) Date: Mar. 22, 2011

(87) PCT Pub. No.: WO2010/025810
PCT Pub. Date: Mar. 11, 2010

(65) Prior Publication Data
US 2011/0226127 A1 Sep. 22, 2011

(30) Foreign Application Priority Data
Sep. 4, 2008 (DE) .................. 10 2008 046 409

(51) Int. Cl.
*B03C 3/017* (2006.01)
*B03C 3/013* (2006.01)
*B01D 47/00* (2006.01)

(52) U.S. Cl.
USPC ............... 95/64; 95/65; 95/71; 96/52; 96/53; 118/61; 55/DIG. 46

(58) Field of Classification Search
USPC .......... 95/149–240; 134/1–42; 427/457–601
See application file for complete search history.

(56) References Cited

U.S. PATENT DOCUMENTS

| | | | |
|---|---|---|---|
| 3,861,887 A | 1/1975 | Forney | |
| 3,932,151 A | 1/1976 | Lau | |
| 4,130,674 A | 12/1978 | Roberts et al. | |
| 4,207,397 A * | 6/1980 | Davis et al. ........... | 521/26 |
| 4,378,235 A | 3/1983 | Cosper et al. | |
| 4,496,374 A | 1/1985 | Murphy | |
| 4,600,513 A | 7/1986 | Mizutani et al. | |
| 4,629,477 A | 12/1986 | Geke | |
| 4,701,220 A | 10/1987 | Seng | |
| 4,853,132 A | 8/1989 | Merrell et al. | |
| 4,861,491 A * | 8/1989 | Svensson ............. | 210/691 |

(Continued)

FOREIGN PATENT DOCUMENTS

| | | |
|---|---|---|
| DE | 44 01 741 A1 | 7/1995 |
| DE | 195 19 385 A1 | 11/1996 |

(Continued)

*Primary Examiner* — Duane Smith
*Assistant Examiner* — Joubert X Glover
(74) *Attorney, Agent, or Firm* — Factor Intellectual Property Law Group, Ltd.

(57) ABSTRACT

In a method for removing solids from overspray produced when painting objects, the overspray is absorbed by an air flow and is conducted to a deposition surface, across which a deposition liquid flows and where a large part of at least the solids is transferred into the deposition liquid, is discharged by said deposition liquid, and is removed from the liquid by means of a deposition process. A deposition liquid is used and disclosed which comprises a detackifying medium and an optional suspending fluid, paint overspray particles being detackified using the detackifying medium.

20 Claims, 7 Drawing Sheets

(56) References Cited

U.S. PATENT DOCUMENTS

| | | | |
|---|---|---|---|
| 4,913,825 A | 4/1990 | Mitchell | |
| 4,919,691 A * | 4/1990 | Patzelt et al. | 95/189 |
| 4,937,003 A | 6/1990 | Merrell | |
| 5,116,514 A | 5/1992 | Bhattacharyya et al. | |
| 5,250,189 A | 10/1993 | Rey | |
| 5,264,014 A * | 11/1993 | Lannefors et al. | 96/44 |
| 5,326,480 A | 7/1994 | Geke et al. | |
| 5,614,103 A * | 3/1997 | Agree et al. | 210/725 |
| 5,684,053 A * | 11/1997 | Spangler | 521/48 |
| 5,843,337 A | 12/1998 | Mitchell et al. | |
| 6,673,263 B2 * | 1/2004 | Albu et al. | 252/181 |
| 2002/0017223 A1 * | 2/2002 | Summerfield | 106/620 |
| 2004/0000329 A1 * | 1/2004 | Albu et al. | 134/38 |
| 2004/0072931 A1 * | 4/2004 | Thiebes et al. | 524/186 |
| 2004/0245181 A1 | 12/2004 | Foster et al. | |
| 2005/0189216 A1 * | 9/2005 | Krylov | 204/263 |

FOREIGN PATENT DOCUMENTS

| | | |
|---|---|---|
| DE | 10 2005 013 711 A1 | 9/2006 |
| DE | 10 2006 037 022 A1 | 2/2008 |
| EP | 0583314 B1 * | 7/1997 |
| GB | 2204254 A * | 11/1988 |
| GB | 2 400 052 A | 10/2004 |
| WO | 9006181 A1 | 6/1990 |
| WO | 2008067880 A2 | 6/2008 |

* cited by examiner

METHOD FOR THE DEPOSITION OF PAINT
OVERSPRAY, AND DEPOSITION LIQUID

RELATED APPLICATIONS

This application claims the filing benefit of International Patent Application No. PCT/EP2009/005863, filed Aug. 13, 2009, which claims the filing benefit of German Patent Application No. 10 2008 046 409.0 filed Sept. 4, 2008, the contents of which are incorporated herein by reference.

TECHNICAL FIELD

The invention relates to a method for the removal of solids from overspray which arises when articles are painted, in which the overspray is taken up by an air stream and transported to a separating surface over which a separating liquid flows, where a large proportion at least of the solids is transferred to the separating liquid, is transported away thereby and is removed from the liquid by being separated off.

Moreover, the invention relates to a separating liquid for removing solids from overspray which arises when articles are painted.

BACKGROUND OF THE INVENTION

When paints are applied manually or automatically to articles, some of the stream of paint, which in general contains both solids and solvents and/or binders, is not applied to the article. This portion of the stream is called overspray in the art. The overspray is absorbed by the air stream in the spray booth and supplied to a separation process.

In particular in the case of plant having a relatively high paint consumption, for example plant for painting vehicle bodies, it is preferable to use wet separation systems, in which methods of the type mentioned at the outset are used. In plant known from the market, water or oil is used as the separating liquid, and is mixed intensively and turbulently with the exhaust air from the booth and the overspray therein.

So that the particles of paint taken up by the separating liquid can be guided away from the separating surface without problems, the separating liquid must meet particular criteria. These include for example the fact that the adhesive action of the particles of paint must be overridden so that if they come into contact with the separating surface through the separating liquid they do not adhere thereto.

Moreover, the vapour pressure of the separating liquid must be kept at least low enough for the entrainment of gaseous components of the separating liquid by the exhaust air from the booth that flows past to be minimised as far as possible.

So that it is ensured that the separating surface is wetted as evenly as possible without sags or runs, the surface tension of the separating liquid must be sufficiently low.

In particular, it is desirable for the separating liquid to be able to flow down the separating surface in a largely laminar flow, that is to say that a thin film which moves down evenly is formed on the separating surface.

The present invention is directed to resolving these and other matters.

SUMMARY OF THE INVENTION

It is therefore an object of the invention to provide a method and a separating liquid of the type mentioned at the outset which take account of the considerations above and ensure effective removal of overspray from the booth air by the separating liquid.

This object may be achieved, with reference to the method, in that a separating liquid which includes a detackifying medium and where appropriate a carrier fluid is used, in which particles of paint overspray are detackified by the detackifying medium.

The particles of paint overspray may be detackified by an agglomeration of the particles of paint overspray, brought about by the detackifying medium, and/or by curing of the paint overspray, caused or accelerated by the detackifying medium, and/or by the overriding of any emulsion present effected by the detackifying medium.

According to the invention, the adhesive properties of the overspray are thus largely overridden such that the risk of overspray adhering to the separating surface is reduced.

It has been found advantageous for the detackifying medium to be a detackifying medium based on silicates, preferably phyllosilicates, bentonites, sepiolites, clays; based on aluminium salts, preferably aluminium salts which form hydroxides at neutral and alkaline pH values, preferably aluminium sulfate, aluminium chloride, aluminium nitrate; based on zinc salts, preferably zinc salts which form hydroxides at neutral and alkaline pH values, preferably zinc chloride, zinc sulfate; based on iron salts, preferably iron salts which form hydroxides at neutral and alkaline pH values, preferably iron chloride, iron sulfate; based on calcium salts, preferably calcium chloride, calcium nitrate, calcium acetate; based on zirconium salts, preferably zirconium chloride, zirconium acetate; based on polymers, preferably polyacrylamides, polymethacrylamides or melamine/formaldehyde condensation products; or based on amines, preferably diamines, preferably 2-methyl pentamethylene diamine, ethylene diamine.

Depending on whether the overspray to be separated off is based on a water-thinnable paint or a solvent-borne paint, the said detackifying media act as agglomerating agents, cure accelerators or demulsifiers.

Good results have been obtained with separating liquids which include the detackifying medium in a quantity of from 0.1 to 20 weight %, preferably from 1 to 5 weight %, in relation to the total weight of the separating liquid. It is advantageous if water is used as the carrier fluid.

In the case of a separating liquid based on water, it has been found advantageous if this separating liquid further includes one or more polar water-soluble solvents, preferably ethylene glycol, propylene glycol, polyethylene glycol or polypropylene glycol. Solvents of this kind act as solubilising agents and make it easier for the paint overspray to be taken up by the separating liquid.

Here, it has be found particularly advantageous if the separating liquid includes polar water-soluble solvent in a quantity of from 1 to 60 weight %, preferably from 20 to 40 weight %, in relation to the total weight of the separating liquid.

There is an improvement in the takeup of particles of paint overspray with a separating liquid based on water if this separating liquid further includes one or more wetting agents, preferably non-ionic, anionic or cationic surfactants, particularly preferably non-ionic surfactants, preferably fatty alcohol ethoxylates or fatty alcohol propoxylates.

In this case, it is advantageous if the separating liquid includes wetting agents in a quantity of from 0.1 to 5 weight % in relation to the total weight of the separating liquid. The wetting agents can be used to adjust the surface tension of the separating liquid and its adhesion and flow behaviour on the separating surface.

A separating liquid based on water of relatively high viscosity may be obtained if it further includes thickeners, preferably cellulose, carboxymethyl cellulose, methyl ethyl cellulose, hydroxypropyl cellulose, hydroxypropyl ethyl cellulose, polysaccharides, gum arabic, xanthan gum or modified starch, particularly preferably carboxymethyl cellulose. In this case, it is advantageous if the separating liquid includes thickeners in a quantity of from 0.1 to 5 weight %, preferably from 0.1 to 1 weight %, in relation to the total weight of the separating liquid.

A viscous separating liquid flows more slowly, with the result that a certain volume of this separating liquid is in contact with the booth air laden with overspray for longer and can take up a greater proportion of overspray than the same volume of a thinner separating liquid.

To increase the storage life of the water-based separating liquid, it is advantageous if this separating liquid further includes preservatives, preferably isothiazolines; quaternary ammonium compounds, preferably didecyl diammonium chloride, dioctyl diammonium chloride; dimethylol dimethyl hydantoin; bromochlorodimethyl hydantoin or bisoxazolidine; preferably in a quantity of from 0.5 to 10 weight % in relation to the total weight of the separating liquid.

In the case of an alternative separating liquid, it is advantageous if an oil serves as the carrier fluid. The term "oil" is intended to mean any oily liquids whereof the viscosity is inherently greater than that of water. For example, paraffinic or naphthenic raffinates are suitable. Other suitable oils are for example base oils, rape seed oil or palm oil. Oils have inherent advantageous features, such as a relatively high viscosity and a relatively low surface tension, which make them highly suitable as the carrier fluid.

It has been found practical if an oil-based separating liquid further includes stabilising agents, preferably in the form of organic acids, preferably in the form of fatty acids, particularly preferably in the form of oleic acid, palmitic acid, stearic acid or hydroxystearic acid, in a quantity of from 0.1 to 15 weight % in relation to the total weight of the separating liquid.

Where the intention is to produce a relatively pasty separating liquid, it has been found advantageous if this separating liquid further includes a fatty acid in a quantity of from 1 to 30 weight %, preferably from 3 to 20 weight %, in relation to the total weight of the separating liquid, preferably oleic acid or stearic acid.

In this case, it is advantageous if the separating liquid further includes a metal hydroxide, preferably sodium hydroxide, potassium hydroxide or lithium hydroxide, in a quantity of from 1 to 5 weight % in relation to the total weight of the separating liquid.

It is advantageous if the viscosity of the separating liquid, as measured using a flow cup to DIN EN ISO 2431, of which the German version is EN ISO 2431:1996, dating from 1996, with an outflow opening 6 mm in diameter, is between 2 and 100 seconds, preferably between 5 and 20 seconds and particularly preferably 10.5 seconds.

Particularly good separation results are obtained if the separating liquid is electrically conductive and paint overspray is ionised using an electrode means and is separated off at the separating surface by the electrode means being connected to the first pole of a high-voltage source and the separating surface being connected to the second pole of the high-voltage source.

The ratio of detackifying medium to carrier fluid in the separating liquid may be adapted individually to the type of overspray if the carrier fluid and the detackifying medium are supplied to a storage container independently of one another.

From an environmental point of view, it is particularly advantageous if the separating liquid laden with paint overspray is re-prepared and re-used.

The re-preparation may advantageously be performed by means of filtering including at least one filter stage.

It is advantageous if the viscosity of the separating liquid supplied to the separating surface is measured. Where appropriate, the viscosity of the separating liquid may be corrected by the addition of individual components.

It is to be understood that the aspects and objects of the present invention described above may be combinable and that other advantages and aspects of the present invention will become apparent upon reading the following description of the drawings and detailed description of the invention.

DETAILED DESCRIPTION OF THE PRESENT INVENTION

Figure 1:
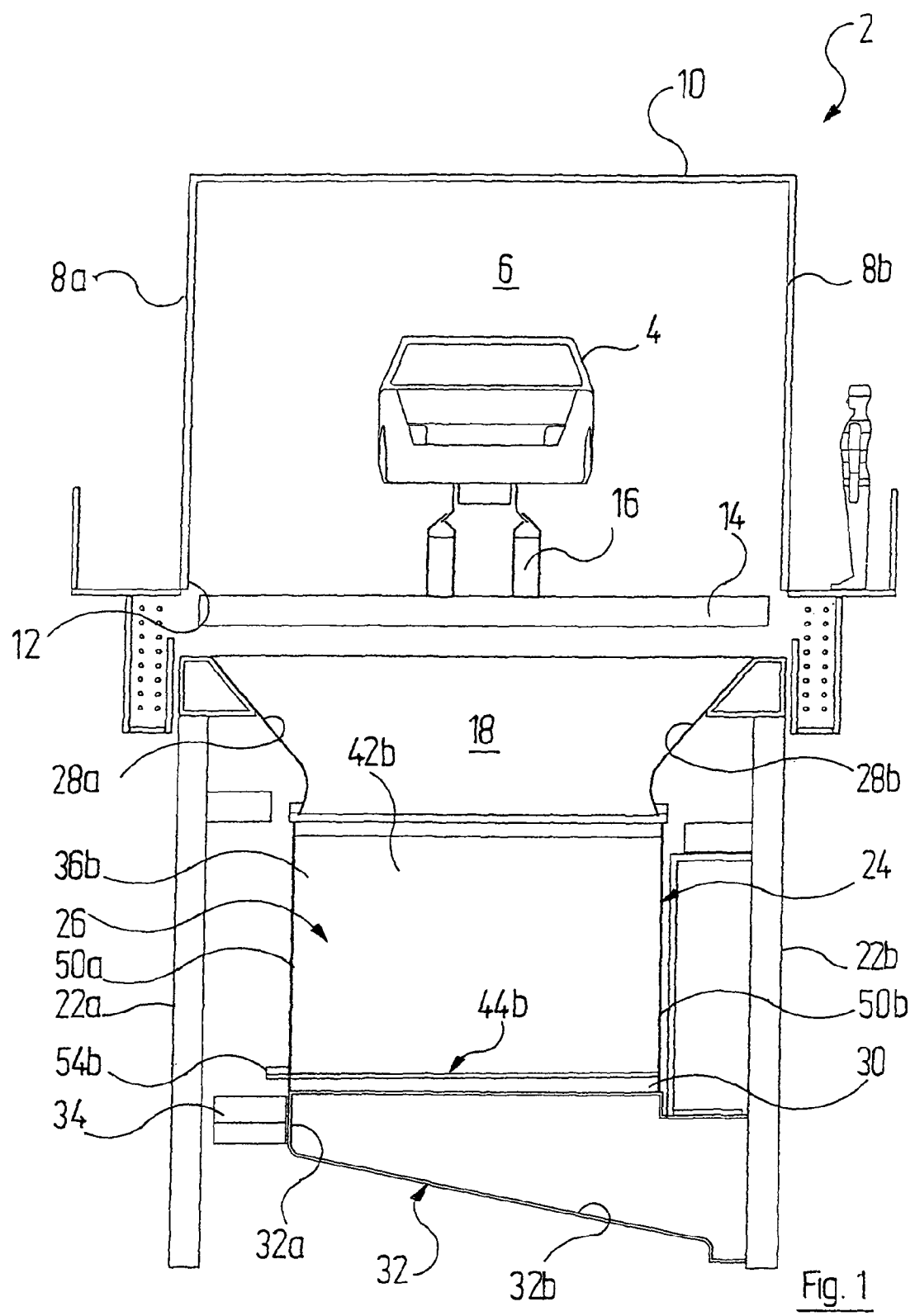
FIG. 1 shows a paint booth of a coating plant, with a first exemplary embodiment of an overspray separating device, in a front view.

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

Figure 2:
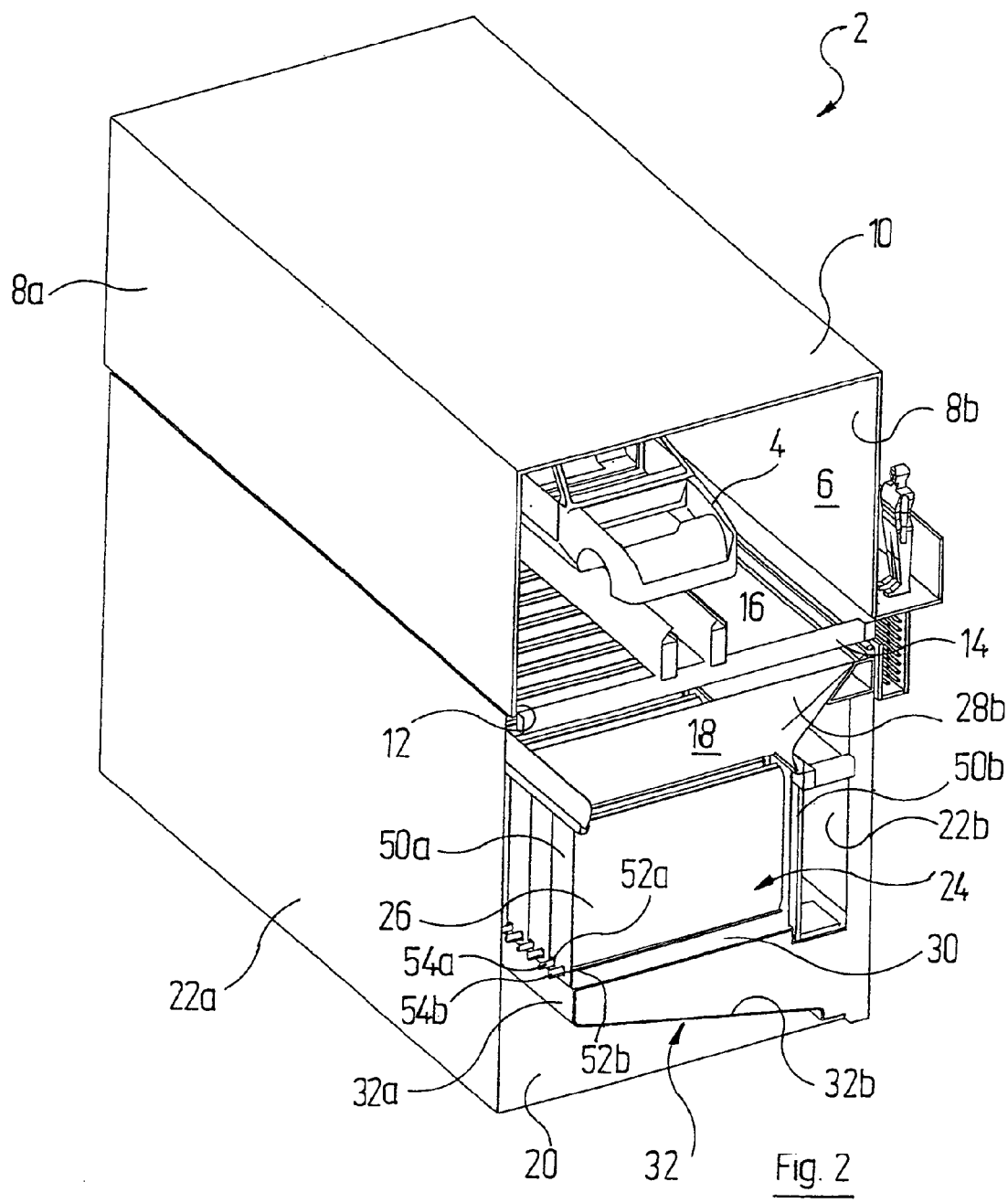
FIG. 2 shows the paint booth from FIG. 1, in a perspective view.

Reference will first of all be made to FIGS. 1 and 2. Here, 2 designates as a whole a paint booth of a coating plant in which vehicle bodies 4 are painted, after they have been cleaned and degreased for example in pre-treatment stations which are upstream of the paint booth 2 and are not themselves shown.

The paint booth 2 includes a painting tunnel 6 which is arranged at the top and is delimited by vertical side walls 8a, 8b and a horizontal booth ceiling 10 but which at the end sides and downwards is open such that exhaust air from the booth which is laden with overspray can flow downwards. The booth ceiling 10 takes the form, in conventional manner, of the lower delimitation of the air supply chamber (not illustrated), having a filter ceiling.

Arranged at the level of the lower opening 12 of the painting tunnel 6, which is flanked by the lower edges of the side walls 8a, 8b, is a steel structure 14 which carries a conveyor system 16 which is known per se and which is not described in more detail here. This can be used to transport vehicle bodies 4 that are to be painted from the entry side of the painting tunnel 6 to the exit side thereof. Inside the painting tunnel 6 there are application means which are not themselves shown and which can be used to apply paint to the vehicle bodies 4 in a manner known per se.

Below the lower opening 12 of the painting tunnel 6 there is a separating chamber 18 which is upwardly open, towards the painting tunnel 6, and in which paint overspray which arises during the painting procedure is separated off.

The separating chamber 18 is delimited by a base plate 20 (visible in FIG. 2), two vertical side walls 22a, 22b and two vertical end walls, with these last being omitted from FIGS. 1 and 2. Arranged in the separating chamber 18 is a separating device 24 having a plurality of separating units 26 which are arranged one behind the other in the longitudinal direction of the separating chamber 18 and which will be described in more detail below.

In the region of the separating chamber 18 between the separating device 24 and the painting tunnel 6 there are two air baffles 28a, 28b which, starting from the side walls 22a, 22b of the separating chamber 18, first converge downwards and, in their end region facing the separating device 24, diverge towards the lateral delimitations of the separating device 24. The air baffles 28a, 28b and corresponding air baffles (not illustrated) at the end sides extend downwards as far as the separating device 24.

The separating units 26 rest on a carrying frame 30 which allows air to flow downwards out of the separating device 24. Below the separating device 24 there is a further air baffle 32 which extends along the separating device 24 in the separating chamber 18. The air baffle 32 has a vertical section 32a which faces the side wall 22a of the separating chamber 18, on the left in FIGS. 1 and 2, and a section 32b which runs obliquely downwards in the direction of the opposing side wall 22b of the separating chamber 18. Between the vertical section 32a of the air baffle 32 and the side wall 22a of the separating chamber 18, on the left in FIGS. 1 and 2, there is arranged a collecting channel 34, shown only schematically in FIG. 1, which extends parallel to the vertical section 32a of the air baffle 32 and is inclined in the longitudinal direction in relation to a horizontal plane.

Figure 3:
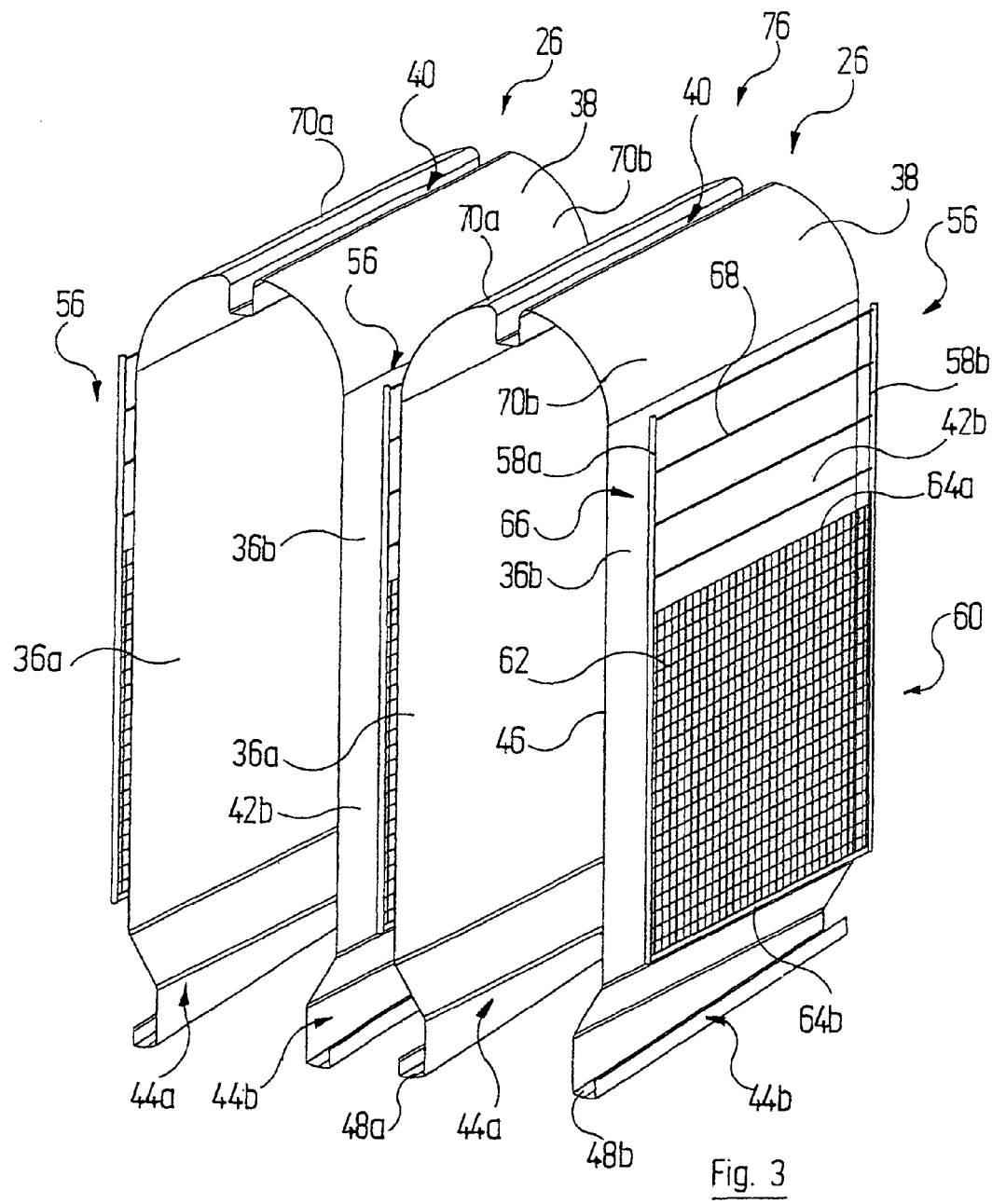
FIG. 3 shows a perspective view of two separating units and three electrode means of the separating device from FIG. 1.
Figure 4:
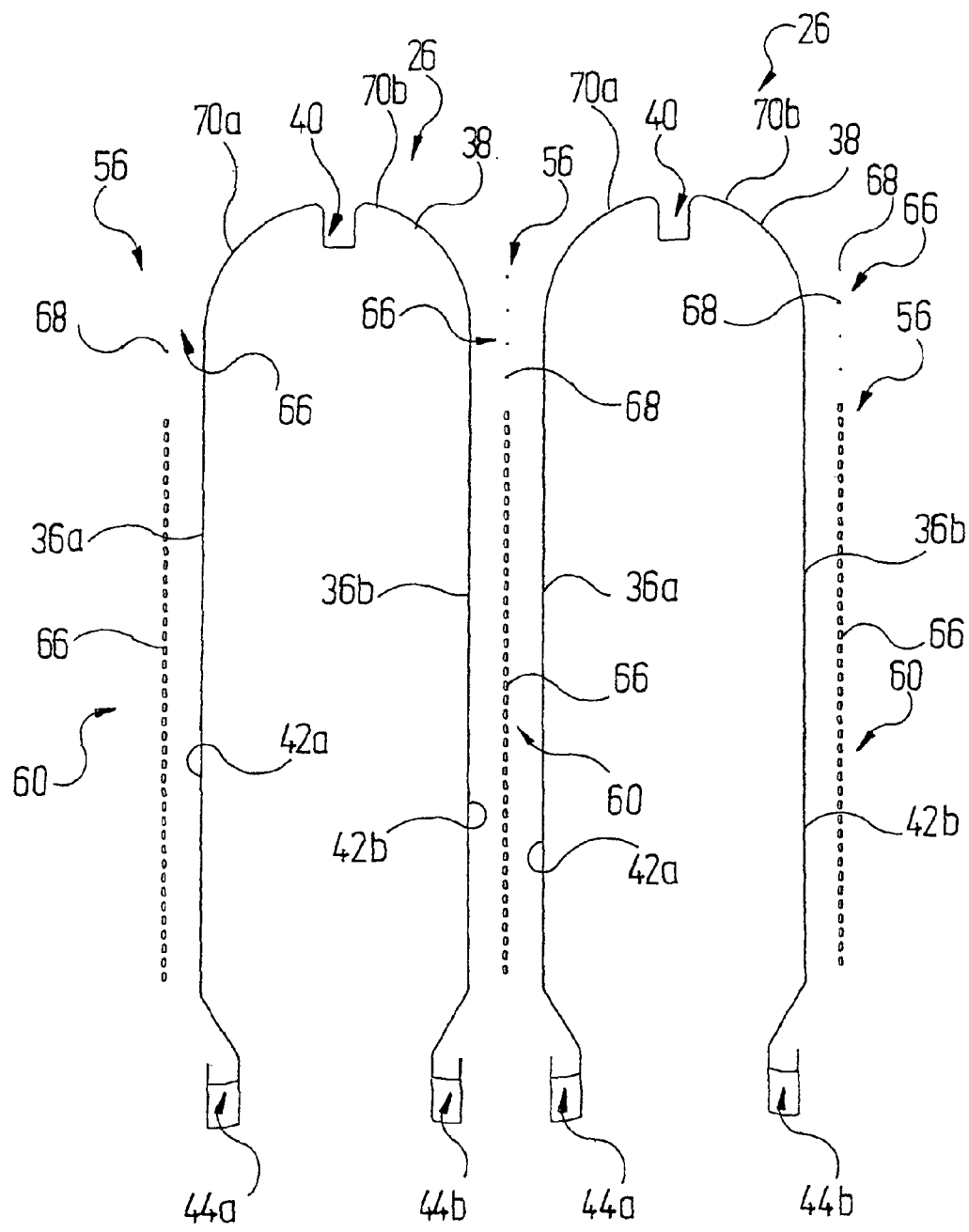
FIG. 4 shows the two separating units with electrode means from FIG. 3, in vertical section.

FIGS. 3 and 4 show two adjacent separating units 26 of the separating device 24. As can be seen there, a separating unit 26 includes two parallel, mutually spaced rectangular side panels 36a, 36b which are connected to one another at their upper opposing end edges by a curved section 38 whereof the cross section of the internal shape of the outer contour corresponds to a semicircle and forms the upper side of the separating unit 26.

At its apex, the curved section 38 of the separating units 26 is constructed to have the form of an overflow channel 40, about which more details will be given below.

The respective outer surfaces of the side panels 36a, 36b form separating surfaces 42a and 42b respectively, about which, again, more details will be given below.

At their lower edges, the side panels 36a, 36b each carry a drainage channel 44a, 44b which runs parallel to the side panels 36a, 36b of the separating units 26 and is inclined downwards in the direction of a first end side 46 of the separating unit 26, at the front in FIG. 3. The drainage channels 44a, 44b terminate at their end sides with the side panels 36a, 36b of the separating unit 26 (cf. FIG. 3). At their end 48a and 48b respectively, the drainage channels 44a, 44b are open at the first end side 46 (cf. FIG. 3) of the separating unit 26.

As can be seen in FIGS. 1 and 2, each separating unit 26 includes a first end wall 50a which is arranged on the first end side 46 thereof. The opposing end side of the separating units 26, which is not provided with its own reference numeral, is covered by a second end wall 50b. The end walls 50a, 50b of the separating units 26 close off the end sides of the associated overflow channel 40. The two end walls 50a, 50b are made from synthetic material. The first end wall 50a of the separating unit 26 includes two apertures 52a, 52b into which a respective drainage channel 44a, 44b opens at its ends 48a, 48b. On the side of each side wall 50a opposed to the drainage channels 44a, 44b, drip trays 54a, 54b are mounted at the apertures 52a, 52b. These take the form of a profiled section whereof the cross section corresponds to that of the drainage channels 44a, 44b.

When the separating device 24 is arranged in the separating chamber 18 of the paint booth 2, the drip trays 54a, 54b of each separating unit 26 project beyond the collecting channel 34.

In the separating device 24, each pair of adjacent separating units 26 is arranged with a spacing maintained between them. Between two adjacent separating units 26 and, in the case of the free side panels 36a and 36b respectively of the two outermost separating units 26, within the separating unit 24 there extends a respective electrode means 56, each one connected to a high-voltage source which is not itself shown in FIG. 4. In a modified version, the electrode means 56 may also be supplied from a single high-voltage source. The separating units 26 are at earth potential.

Each electrode means 56 includes two straight and mutually parallel electrode strips 58a, 58b. These hold a grid electrode 62 in a field section 60 of the electrode means 56, the edges 64a, 64b of the grid electrode 62 which extend between the electrode strips 58a, 58b being perpendicular thereto. In a corona section 66 of the electrode means 56, the electrode strips 58a, 58b hold a plurality of corona wires 68 which function as a discharge electrode. The corona wires 68 run in a plane predetermined by the electrode strips 58a, 58b, parallel to the edges 64a, 64b of the grid electrode 62, and are arranged at the same spacing from one another.

As can be seen in FIGS. 3 and 4, the overall extent of the electrode means 56 corresponds substantially to the extent of the side panels 36a, 36b of the separating units 26. The electrode means 56 are arranged such that the lower edge 64b of the grid electrode 62 is arranged approximately at the level of the lower end of the side panels 36a and 36b.

When the separating device 24 is in operation, a separating liquid, which is suitable for taking up solid particles from the paint overspray arising during the painting procedure, flows down each separating surface 42a, 42b of the side panels 36a, 36b of the separating units 26, into the drainage channels 44a, 44b.

For this purpose, this separating liquid is supplied to the overflow channel 40 in the curved section 38 of the separating units 26. From there the separating liquid passes over the curved flanks 70a, 70b of the curved section 38 of the separating unit 26, which run next to the overflow channel 40, in each case as a cohesive film, to reach the side panels 36a, 36b and flows down the separating surfaces 42a, 42b thereof as a still cohesive film of separating liquid.

The number of corona wires 68 of the electrode means 56, and their spacing from one another, may vary as a function of the separation behaviour of the overspray particles. In the present exemplary embodiment, four corona wires 68 are provided, of which the topmost is arranged next to the curved section 38 of the separating unit 26, whereas the corona wire 68 below it is still in the region of the respective side panel 36a or 36b of the separating unit 26.

Figure 5:
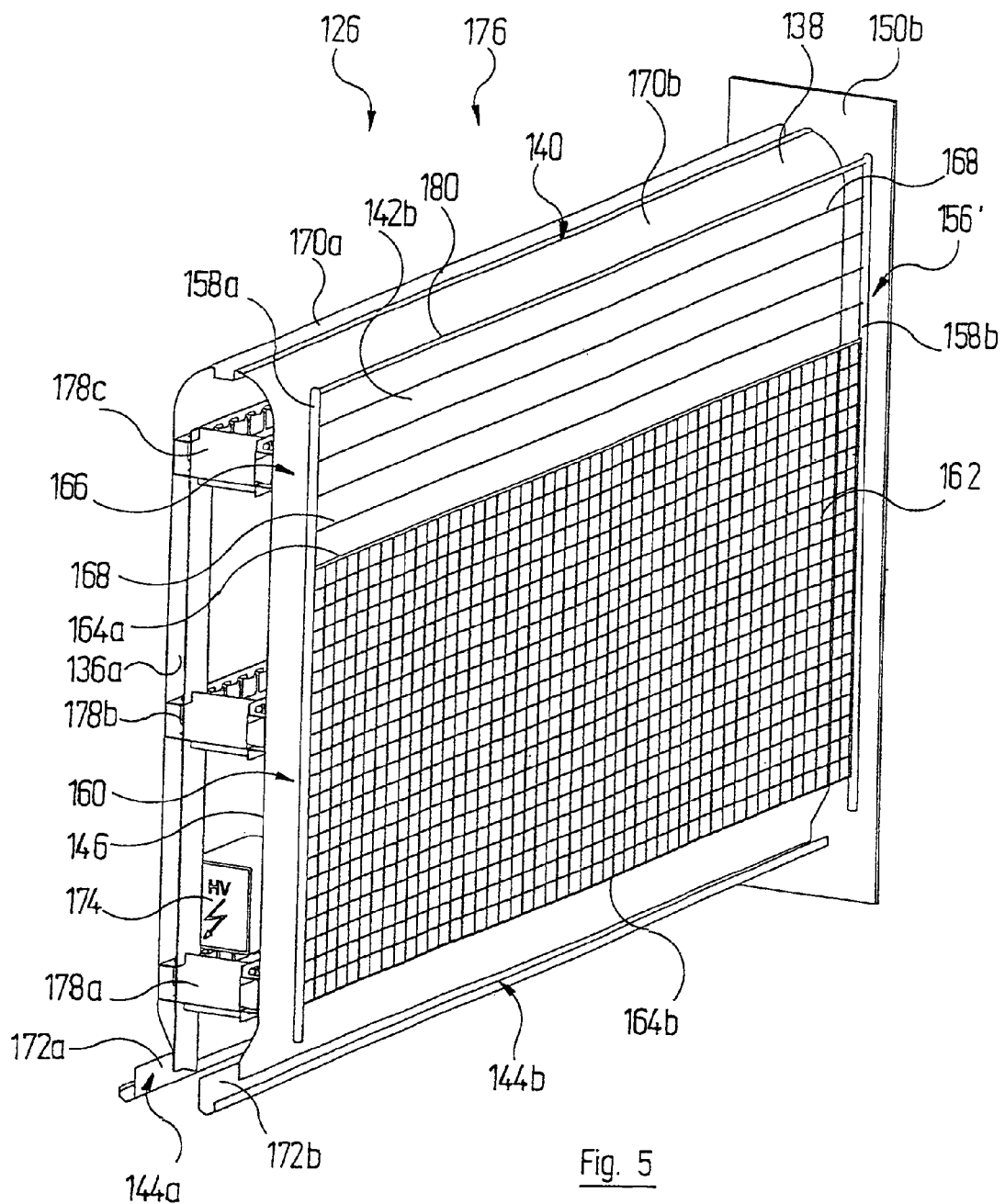
FIG. 5 shows a perspective view of two separating units and three electrode means, in each case according to a second exemplary embodiment.
Figure 6:
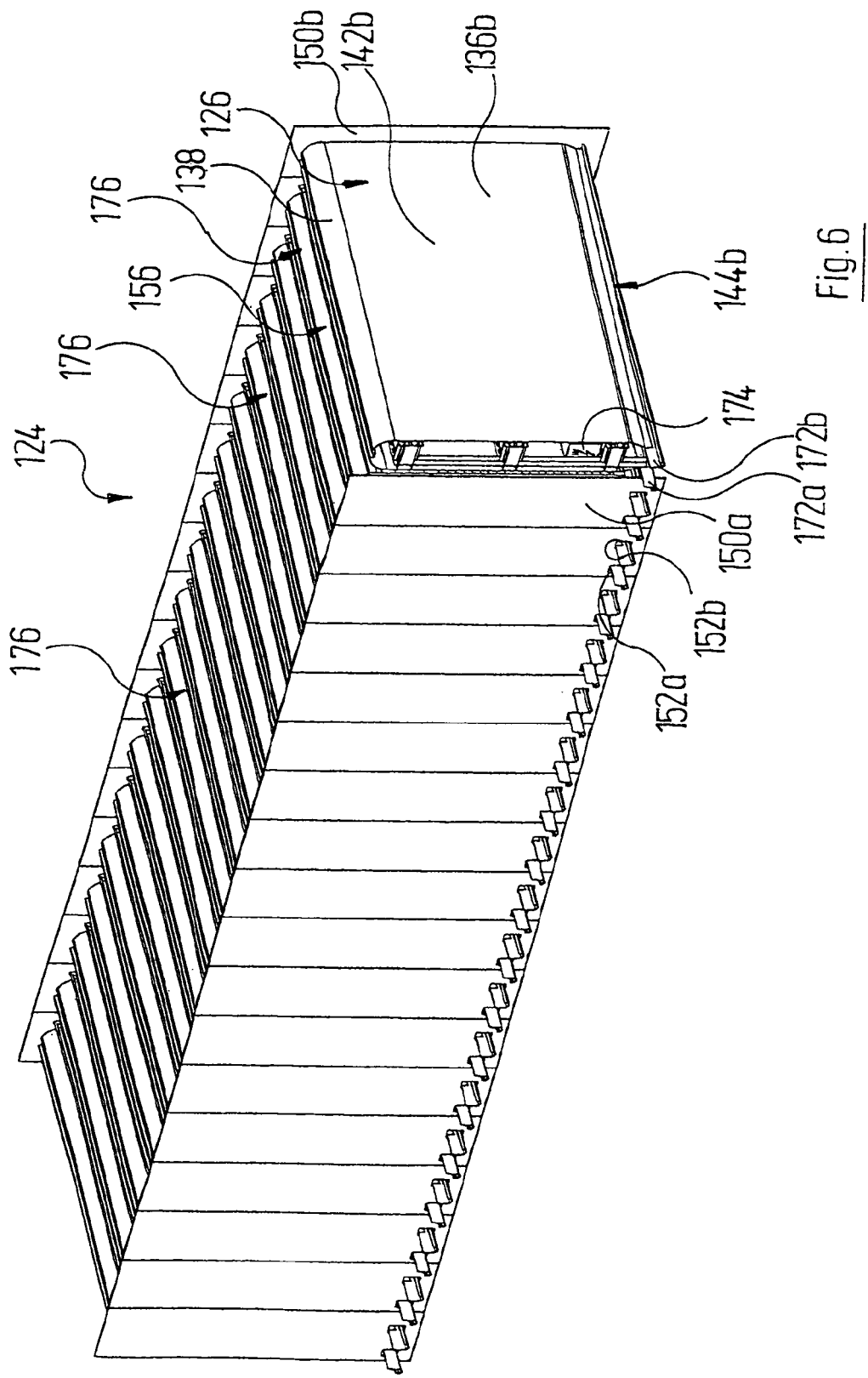
FIG. 6 shows a perspective view of a second exemplary embodiment of an overspray separating device which includes a plurality of separating units and electrode means from FIG. 5.

FIG. 5 shows, in each case as a second exemplary embodiment, a modified separating unit 126 and a modified electrode means 156, and FIG. 6 shows a modified separating device 124 which includes these. Components of the separating unit 126, the electrode means 156 and the separating device 124 that correspond to those of the separating unit 26, the electrode means 56 and the separating device 24 in FIGS. 1 to 4 are designated by the same reference numerals plus 100.

The separating unit 126 differs from the separating unit 26 among other things in that the drainage channels 144a, 144b project beyond the end side 146 of the separating unit 126. The projecting sections 172a, 172b correspond to the drip trays 54a, 54b described above, and for this reason they need not be described in connection with the separating device 124.

As can be seen in FIG. 6, the projecting sections 172a, 172b of the drainage channels 144a, 144b of the separating unit 126 extend through the respective apertures 152a, 152b in each end wall 150a of the separating device 124.

FIG. 5 shows a high-voltage source 174 which is arranged between the side panels 136a, 136b of each separating unit 126 and is connected to the electrode means 156. The high-voltage source 174 may also, correspondingly, be provided for each separating unit 26 according to the first exemplary embodiment. In each case, an individual separating unit 126 and an individual electrode means 156 in this way form a separating module 176. Accordingly, an individual separating unit 26 and an individual electrode means 56 in each case form a separating module 76 in FIGS. 1 to 4.

In FIG. 5, struts 178a, 178b, 178c are also visible, and these connect to one another the inner faces of the two side panels 136a, 136b of the separating unit 126 at the bottom, in the centre and at the top.

In the case of the electrode means 156 according to the second exemplary embodiment, a protective rod 180 runs perpendicularly between the electrode strips 158a, 158b above the topmost corona wire 168 and reduces the risk that objects or particles which may fall out of the painting tunnel 6 and onto the electrode means 156 will come into contact with the corona wires 168.

Otherwise, what was said above in relation to the separating unit 26, the electrode means 56 and the separating device 24 also applies correspondingly to the separating unit 126, the electrode means 156 and the separating device 124.

The basic principle of the devices described above will now be explained by way of the example of the separating device 24 according to FIGS. 1 to 4. The separating device 124 according to FIGS. 5 and 6 in the paint booth 2 is used in similar manner.

When the vehicle bodies are painted in the painting tunnel 6, the booth air there is laden with particles of paint overspray. These may still be liquid and/or tacky, but may also already be more or less solid. The exhaust air from the booth that is laden with paint overspray flows through the lower opening 12 of the painting tunnel 6 and into the separating chamber 18. There, this air is deflected by the air baffles 28a, 28b in the direction of the separating device 24 and flows through between adjacent separating units 26 in the direction of the lower air baffle 32.

At the corona wires 68, corona discharges occur in a manner known per se, and these effectively ionise the overspray particles in the exhaust air from the booth which flows past.

The ionised overspray particles move past the earthed side panels 36a, 36b of two adjacent separating units 26 and the grid electrode 62 between them, in the first section 60 of the electrode means 56. Because of the electrical field formed between the grid electrode 62 and the side panels 32a, 32b, the ionised overspray particles are separated at separating surfaces 42a, 42b of the side panels 36a, 36b of the separating units 26 and are taken up there by the separating liquid flowing along them.

Some of the ionised overspray particles are already separated off at the separating units 26 in the second section 66 of the electrode means 56 in the region of the corona wires 68. The electrical field between the corona wires 68 and the respective side panel 36a, 36b of the separating unit 26 is more inhomogeneous than the electrical field in the region of the grid electrode 62, however, and for this reason separation of the ionised overspray particles at the corresponding separating unit 26 is more directed and more effective there.

The air which is cleaned as it passes between the separating units 26 is deflected, by the lower air baffle 32, in the direction of the side wall 22b of the separating chamber 18, shown on the right in FIGS. 1 and 2, and from there it can be supplied to the painting tunnel 6 again as fresh air, where appropriate after undergoing certain treatment. The treatment may in particular be a readjustment of the temperature, the air humidity and where appropriate the removal of solvents that are still present in the air.

The separating liquid which flows down over the separating units 26 and is now laden with the overspray particles goes down into the drainage channels 44a, 44b of the separating units 26. As a result of the inclination of the drainage channels 44a, 44b, the laden separating liquid flows in the direction of the apertures 52a, 52b in the respective end walls 50a, through these from there via the drip trays 54a, 54b into the collecting channel 34. The separating liquid laden with overspray particles flows through the collecting channel 34 and out of the paint booth 2 and may be supplied to a cleaning and re-preparation step, in which the overspray particles are removed from the separating liquid, or to a disposal step.

Figure 7:
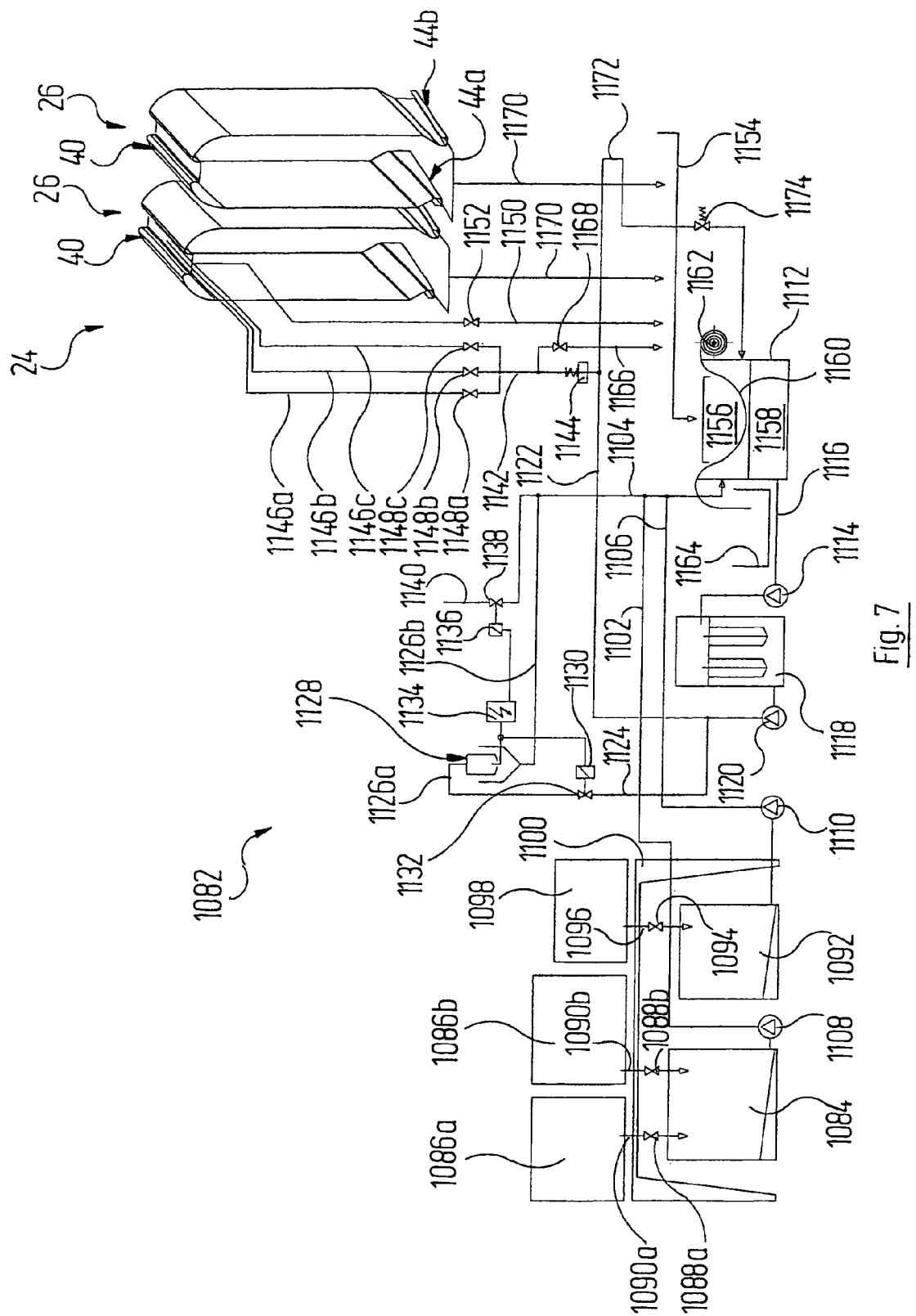
FIG. 7 shows a block diagram of a plant for supplying a separating liquid to separating units.

In FIG. 7, 1082 designates as a whole a plant by means of which a separating liquid is supplied to the separating units 26 and separating liquid laden with particles of paint overspray is re-prepared for renewed use. Instead of the separating units 26, separating units 126 may also be provided.

The plant 1082 includes a reservoir 1084 (arranged on the left in FIG. 7), in which a basic mixture of the separating liquid including all the components apart from the detackifying medium is mixed together. For this purpose, the reservoir 1084 may be in fluid connection with a plurality of vessels in which the individual components of the separating liquid are provided. FIG. 7 shows by way of example two such vessels 1086a, 1086b which are connected to the reservoir 1084 by way of lines 1090a, 1090b provided with shutoff valves 1088a, 1088b.

The plant 1082 moreover includes a further reservoir 1092 for the detackifying medium, which for its part may be connected by way of a line 1096 provided with a shutoff valve 1094 to a vessel 1098 in which the detackifying medium is supplied. The supply vessels 1086a, 1086b and 1098 may be placed on a loading ramp 1100. From the reservoir 1084, a line 1102 leads to a collecting line 1104 which for its part is connected by way of a line 1106 to the detackifying medium reservoir 1092. A respective pump 1108 and 1110 is arranged in the lines 1102 and 1106, and these allow the content of the respective reservoir 1084 and 1092 to be conveyed in metered manner to the collecting line 1104.

The collecting line 1104 opens into a storage container 1112 in which the base material from the reservoir 1084 and the detackifying medium from the reservoir 1092 are combined and thoroughly mixed.

For its part, the storage container 1112 communicates, by way of a line 1116 provided with a pump 1114, with a fine filter 1118 of a kind known per se. The separating liquid conveyed out of the storage container 1112 by means of the pump 1114 flows through this fine filter 1118 and leaves it again by way of a discharge line 1122 provided with a pump 1120.

Downstream of the pump 1120 there runs a bypass line 1124 which has a first section 1126a, which leads to the inlet of a viscometer 1128 which is known per se, and a section 1126b which leads from the outlet of the viscometer 1128 to the collecting line 1104.

Arranged in the first section 1126a of the bypass line 1124 is a valve 1132 actuated by an electromagnet 1130 which is supplied with power by an energy source 1134 which also provides energy to the viscometer 1128. The energy source 1134 moreover serves as an energy supply for an electromagnet 1136 of a valve 1138 which is controlled thereby and which disconnects the collecting line 1104 from a line 1140 supplying the respectively used carrier fluid or connects these two lines 1140, 1104 to one another. The line 1140 is in communication with a reservoir (not shown) in which the carrier fluid is stored. Downstream of the connection point to the bypass line 1124, the discharge line 1122 coming from the fine filter 1118 is connected to a supply line 1142 in which there is arranged a spring-loaded valve 1144. The supply line 1142 is divided into three line branches 1146a, 1146b, 1146c, in each of which a shutoff valve 1148a, 1148b, 1148c is arranged. The line arms 1146a, 1146b, 1146c lead to the upper side of a separating unit 26.

Overall, the plant 1082 includes the same number of supply lines 1142 having corresponding line branches 1146a, 1146b, 1146c as there are separating units 26 of the separating means 24.

From the overflow channel 40 of each separating unit 26, a removal line 1150 which, for its part, has a shutoff valve 1152 leads to a return line 1154. The return line 1154 opens into an upper chamber 1156 of the storage container 1112 that is separated from a lower chamber 1158 thereof by a filter 1160 of nonwoven material. The filter 1160 of nonwoven material is moved along above the level of the separating liquid in the storage container 1112 and for this purpose takes the form of a strip which may be unwound from a roll 1162. The unwound filter 1160 of nonwoven material is received in a collecting container 1164. Between the sprung valve 1144 and the line branches 1146a, 1146b, 1146c, the supply line 1142 is connected to a further removal line 1166 in which there is arranged a shutoff valve 1168 and which leads to the return line 1154. The drainage channels 44a, 44b, 144a, 144b of each separating unit 26 are connected to the return line 1154 by way of a removal line 1170 of their own.

Beyond the point at which the supply line 1142 opens, the discharge line 1122 leads by way of a return section 1172 to the lower chamber 1158 of the storage container 1112, with a spring-loaded shutoff valve 1174 arranged in the return section 1172.

The plant 1082 described above operates as follows:

The components in the reservoirs 1084 and 1092 are conveyed, in the desired mixing ratio, to the lower chamber 1158 of the storage container 1112 by way of the collecting line 1104. The separating liquid there includes not only a freshly mixed portion but also cleaned separating liquid, a point which will be returned to below.

The separating liquid in the lower chamber 1158 of the storage container 1112 flows through the fine filter 1118 and is guided by way of the supply line 1142 having the line branches 1146a, 1146b and 1146c to a respective separating unit 26.

The separating liquid is conveyed by means of the pump 1120 downstream of the fine filter 1118 at a rate of conveying at which the spring-loaded valve 1144 in the supply line 1142 opens, for example 20 litres per minute.

By dividing the supply line 1142 into the line branches 1146a, 1146b, 1146c, it is possible to perform fine adjustment of the quantity of separating liquid reaching the respective discharge unit 26. For this purpose, the valves 1148a, 1148b, 1148c are switched appropriately such that separating liquid is discharged to the discharge unit 26 through one or two or all three lines 1146a, 1146b, 1146c. Where appropriate, it is also possible to provide more than three line branches 1146 having valves 1148. For example, the separating liquid leaves the line branches 1146a, 1146b, 1146c at a throughput of 0.2 to 0.3 litres per metre per minute. The throughput through each line branch 1146a, 1146b, 1146c may be adjusted by way of the through cross-section thereof or by using valves 1148a, 1148b, 1148c whereof the through cross-section is adjustable.

If the rate of conveying of the pump 1120 is too large in relation to the blocking action of the sprung valve 1144 in the supply line 1142, the spring-loaded shutoff valve 1174 in the return line 1172 opens and the separating liquid is conveyed in a circuit, back to the lower chamber 1158 of the storage container 1112, by the fine filter 1118. For example, the shutoff valve 1174 opens if the pressure thereon exceeds 1 bar.

The viscometer 1128 may be used to measure the viscosity of the separating liquid coming from the fine filter 1118. For this purpose, the solenoid valve 1132 is opened such that some of the separating liquid coming from the fine filter 1118 reaches the viscometer 1128. The separating liquid leaving the viscometer 1128 is supplied to the collecting line 1104 again by way of the line section 1126b and from there to the lower chamber 1158 of the storage container 1112 again. If the viscosity measurement shows that the separating liquid has too high a viscosity, the solenoid valve 1138 can be opened such that the respective carrier fluid passes from the line 1140 into the collecting line 1104, as a result of which the separating liquid in the storage container 1112 is thinned and the viscosity thereof is reduced.

If the viscosity of the separating liquid is too low, it can be increased by a corresponding change to the supply of components from the supply vessels.

The separating liquid coming from the discharge channels 44a, 44b, 144a, 144b of a separating unit 26 and laden with particles of paint overspray is guided to the upper chamber 1156 of the storage container 1112 by way of the removal lines 1170 and the return line 1154. In the upper chamber 1156 of the storage container 1112, gravity causes it to move down through the filter 1160 of nonwoven material into the lower chamber 1158 of the storage container 1112, which it reaches filtered and largely free of particles of paint overspray. During this, the particles of paint overspray entrained by the separating liquid are retained on the filter 1160 of nonwoven material. Once the section of the filter 1160 of nonwoven material in the storage container 1112 has taken up the maximum quantity of particles of paint overspray and a satisfactory filtering result at an appropriate throughput of separating liquid through the filter 1160 of nonwoven material is no longer guaranteed, the filter 1160 of nonwoven material is unrolled from the roll 1162 until an unladen section of the filter 1160 of nonwoven material separates the chambers 1156 and 1158 of the storage container 1112 from one another. The respective section of the filter 1160 of nonwoven material that is laden with particles of paint overspray is received in the collecting container 1164, as mentioned above.

If the filter action of the filter 1160 of nonwoven material grows less over time or is in principle not sufficient to retain even the smallest particles, the latter are filtered out by the fine filter 1118 such that only largely cleaned and unladen separating liquid reaches the discharge line 1122 and is guided from there to the separating units 26.

The lines 1142 having the line branches 1146*a*, 1146*b*, 1146*c* and the overflow channel 40, 140 of the respective separating unit 26 may be emptied by way of the removal lines 1150 and 1170. This may for example be necessary if the separating liquid is to be changed.

Using the plant 1082, separating liquid may be used in a circuit in which there is arranged the separating means 24 with the separating units 26. Here, it is possible to free separating liquid that is laden with particles of paint overspray from the latter and to supply it back into the circuit.

Below there are given examples of the composition of the separating liquid which have been found to be suitable in practice, and in which the figures by weight % relate to the total weight of the respective separating liquid.

EXAMPLE 1

A thin water-based separating liquid which was suitable for separating solvent-borne paints or two-pack paints had the following composition:
62 weight % of water
35 weight % of monoethylene glycol
1 weight % of fatty alcohol ethoxylate (7EO)
2 weight % of 2-methyl pentamethylene diamine.

EXAMPLE 2

A thin water-based separating liquid which was suitable for separating water-thinnable paints had the following composition:
62 weight % of water
35 weight % of monoethylene glycol
2 weight % of zinc sulfate heptahydrate
0.7 weight % of fatty alcohol ethoxylate (7EO)
0.3 weight % of didecyl diammonium chloride.

EXAMPLE 3

A viscous water-based separating liquid which gave good results when used for separating solvent-borne paints or two-pack paints had the following composition:
64.25 weight % of water
0.75 weight % of carboxymethyl cellulose
32 weight % of monoethylene glycol
0.5 weight % of fatty alcohol ethoxylate (7EO)
2.5 weight % of 2-methyl pentamethylene diamine.

EXAMPLE 4

A viscous water-based separating liquid which gave good results when used for separating water-thinnable paints had the following composition:
62 weight % of water
35 weight % of monoethylene glycol
2 weight % of zinc sulfate heptahydrate
0.3 weight % of fatty alcohol ethoxylate (7EO)
0.5 weight % of cellulose (Natrosol 250 HHR)
0.2 weight % of didecyl diammonium chloride.

EXAMPLE 5

An oil-based separating liquid which gave good results when used for separating solvent-borne paints and two-pack paints had the following composition:
83 weight % of base oil 100/40° C.
14.5 weight % of oleic acid
2.5 weight % of 2-methyl pentamethylene diamine.

EXAMPLE 6

A pasty oil-based separating liquid which gave good results when used for separating solvent-borne paints and two-pack paints had the following composition:
90 weight % of base oil 120/40° C.
3.5 weight % of castor oil
3.5 weight % of hydroxystearic acid
1.2 weight % of lithium hydroxide
1.8 weight % of 2-methyl pentamethylene diamine.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

The invention claimed is:

1. A method for the removal of solids from overspray which arises when articles are painted, in which the overspray is taken up by an air stream and transported to a separating surface over which a separating liquid flows, where a proportion at least of solids is transferred to the separating liquid, is transported away thereby and is removed from the liquid by being separated off,
wherein
a separating liquid which includes a detackifying medium and where appropriate a carrier fluid is used, in which particles of paint overspray are detackified by the detackifying medium, and
wherein the separating liquid is electrically conductive and paint overspray is ionised using an electrode means and is separated off at the separating surface by the electrode means being connected to a first pole of a high-voltage source and the separating surface being connected to a second pole of the high-voltage source.

2. The method of claim 1, wherein the detackifying medium is a detackifying medium derived from silicates, phyllosilicates, bentonites, sepiolites, clays; derived from aluminium salts, aluminium salts which form hydroxides at neutral and alkaline pH values, aluminium sulfate, aluminium chloride, aluminium nitrate; derived from zinc salts, zinc salts which form hydroxides at neutral and alkaline pH values, zinc chloride, zinc sulfate; derived from iron salts, iron salts which form hydroxides at neutral and alkaline pH values, iron chloride, iron sulfate; derived from calcium salts, calcium chloride, calcium nitrate, calcium acetate; derived from zirconium salts, zirconium chloride, zirconium acetate; derived from polymers, polyacrylamides, polymethacrylamides or melamine/formaldehyde condensation products; or derived from amines, diamines, preferably 2-methyl pentamethylene diamine, ethylene diamine.

3. The method of claim 2, wherein separating liquid includes the detackifying medium in a quantity of from 0.1 to 20 weight % in relation to a total weight of the separating liquid.

4. The method of claim 1, wherein the separating liquid includes water as the carrier fluid.

5. The method of claim 4, wherein the separating liquid further includes one or more polar water-soluble solvents, selected from the group consisting of:
ethylene glycol, propylene glycol, polyethylene glycol or polypropylene glycol.

6. The method of claim 5, wherein the separating liquid includes polar water-soluble solvent in a quantity of from 1 to 60 weight % in relation to a total weight of the separating liquid.

7. The method of claim 4, wherein the separating liquid further includes one or more wetting agents, selected from the group consisting of: non-ionic, anionic or cationic surfactants, fatty alcohol ethoxylates or fatty alcohol propoxylates.

8. The method of claim 7, wherein the separating liquid includes wetting agents in a quantity of from 0.1 to 5 weight % in relation to a total weight of the separating liquid.

9. The method of claim 4, wherein the separating liquid further includes thickeners selected from the group consisting of: cellulose, carboxymethyl cellulose, methyl ethyl cellulose, hydroxypropyl cellulose, hydroxypropyl ethyl cellulose, polysaccharides, gum arabic, xanthan gum or modified starch.

10. The method of claim 9, wherein the separating liquid includes thickeners in a quantity of from 0.1 to 5 weight % in relation to a total weight of the separating liquid.

11. The method of claim 4, wherein the separating liquid further includes preservatives selected from the group consisting of: isothiazolines; quaternary ammonium compounds, such as didecyl diammonium chloride, dioctyl diammonium chloride; dimethylol dimethyl hydantoin; bromochlorodimethyl hydantoin or bisoxazolidine; in a quantity of from 0.5 to 10 weight % in relation to a total weight of the separating liquid.

12. The method of claim 1, wherein the separating liquid includes an oil as the carrier fluid.

13. The method of claim 12, wherein the separating liquid further includes stabilising agents selected from the group consisting of: organic acids, fatty acids, oleic acid, palmitic acid, stearic acid or hydroxystearic acid, in a quantity of from 0.1 to 15 weight % in relation to a total weight of the separating liquid.

14. The method of claim 12, wherein the separating liquid further includes a fatty acid in a quantity of from 1 to 30 weight % in relation to a total weight of the separating liquid selected from the group consisting of: oleic acid, palmitic acid, stearic acid or hydroxystearic acid.

15. The method of claim 12, wherein the separating liquid further includes a metal hydroxide in a quantity of from 1 to 5 weight % in relation to a total weight of the separating liquid.

16. The method of claim 1, wherein a viscosity of the separating liquid, as measured using a flow cup to DIN EN ISO 2431, of which the German version is EN ISO 2431: 1996, dating from 1996, with an outflow opening 6 mm in diameter, is between 2 and 100 seconds.

17. The method of claim 1, wherein the carrier fluid and the detackifying medium are supplied to a storage container independently of one another.

18. The method of claim 1, wherein the separating liquid laden with paint overspray is re-prepared and re-used.

19. The method of claim 18, wherein the re-preparation is performed by means of filtering including at least one filter stage.

20. The method of claim 1, wherein a viscosity of the separating liquid supplied to the separating surface is measured.

* * * * *